United States Patent [19]
Braun et al.

[11] Patent Number: 6,138,549
[45] Date of Patent: Oct. 31, 2000

[54] AXIAL PISTON MACHINE WITH IMPROVED WOBBLE DRIVE

[75] Inventors: Berthold Braun, Aisch; Klaus Becker, Herzogenaurach, both of Germany

[73] Assignee: Ina Wälzlager Schaeffler OHG, Herzogenaurach, Germany

[21] Appl. No.: 09/144,847

[22] Filed: Sep. 1, 1998

[30]   Foreign Application Priority Data

Sep. 5, 1997 [DE] Germany .......................... 197 38 813

[51] Int. Cl.[7] .................................................... F01B 3/00
[52] U.S. Cl. .................................................. 92/71; 91/499
[58] Field of Search ................... 91/499; 92/71; 34/60

[56]         References Cited

U.S. PATENT DOCUMENTS 5,934,887   8/1999   Veit .......................................... 417/417

FOREIGN PATENT DOCUMENTS

| 0 242 550 A2 | 10/1987 | European Pat. Off. . |
| 87 04 256 U1 | 6/1987 | Germany . |
| 3919936A | 12/1990 | Germany . |
| 91 12 170 U1 | 12/1992 | Germany . |
| WO 91/09228 | 6/1991 | WIPO . |

*Primary Examiner*—Edward K. Look
*Assistant Examiner*—Thomas E. Lazo
*Attorney, Agent, or Firm*—Henry M. Feiereisen

[57]         ABSTRACT

An axial piston machine, in particular an axial piston pump of a high-pressure cleaning device, includes a wobble drive having a wobble member rotatable about an axis of rotation, and a swash plate rotatably supported by the wobble member and extending at an inclination with respect to the axis of rotation. The swash plate interacts on one end face thereof with at least one piston. For simplification of the assembly of an axial piston machine, the wobble member is so configured as to have a conical portion flared in the direction of the swash plate and formed with a ball race for a ball bearing.

4 Claims, 1 Drawing Sheet

AXIAL PISTON MACHINE WITH IMPROVED WOBBLE DRIVE

BACKGROUND OF THE INVENTION

The present invention relates to an axial piston machine in general, and more particularly to an axial plunger pump for use in a high-pressure cleaning device.

European Pat No. 02 42 550 describes a high-pressure cleaning device which includes an axial plunger pump with a wobble drive. The wobble drive has a wobble member which is rotatable about an axis of rotation and a swash plate which is rotatably supported by the wobble member and extends at an inclination to the axis of rotation. A plurality of plungers bear upon one end face of the swash plate so that operation of the wobble drive together with the swash plate drives the plungers by performing a wobbling rotary motion which is converted in oscillations of the plungers in axial direction. The wobble member is securely fixed on a motor shaft, and a ball bearing is positioned axially next to the wobble member and arranged on the motor shaft for radially supporting the motor shaft, with the ball bearing having an outer ring which is supported by a housing of the high-pressure cleaning device. The ball bearing is configured as angular-contact ball bearing so that axial loads as a result of plunger accelerations are not transmitted into the motor shaft but via the wobble member to the angular-contact ball bearing and from there into the housing. A drawback of this conventional axial plunger pump is the necessity to separately mount the wobble member and the angular-contact ball bearing to the motor shaft so that the overall assembly of the wobble drive becomes increasingly complicated and labor-intensive.

SUMMARY OF THE INVENTION

It is thus an object of the present invention to provide an improved axial piston machine, obviating the afore-stated drawbacks.

In particular, it is an object of the present invention to provide an improved axial piston machine which can easily be assembled and yet is reliable in operation.

These objects, and others which will become apparent hereinafter, are attained in accordance with the present invention by providing a wobble drive having a wobble member rotatable about an axis of rotation, and a swash plate rotatably supported by the wobble member and extending at an inclination with respect to the axis of rotation, with the wobble member having a conical portion flared in the direction of the swash plate and formed with a ball race which is part of a ball bearing.

By providing an axial piston machine in accordance with the present invention, the need for a separate assembly of the ball bearing, e.g. an angular-contact ball bearing, is eliminated. In particular when manufacturing a great number of axial piston machines, the overall manufacturing costs can thus be significantly reduced. in addition, not only the complexity of assembly but also the number of components is decreased because the ball race is now formed on the wobble member, rather than on a separate inner ring. As the ball race is formed on the outer surface area of the conical portion of the wobble member to thus assume the function of an angular ball race for an angular-contact ball bearing, axial forces as a result of plunger accelerations are transmitted into the housing, without exposing the drive shaft that supports the wobble member to axial loads.

Preferably, the ball race is formed on the swash plate distant end of the wobble member. This arrangement results in an overlap of the drive shaft in axial direction by the wobble member and the angular-contact ball bearing. Thus, as there is no lever arm, the application of bending moments via a radial load of the angular-contact ball bearing into the coupling site between the wobble member and the drive shaft is eliminated or negligibly small.

According to a particular preferred feature of the present invention, the base of the ball race of the ball ring is tangent to a cylindrical surface within which the wobble member extends radially. This configuration permits easy manufacture of a ball race for an angular ball bearing, especially through non-cutting manufacturing processes. The shaping tool is substantially moved parallel to the cylindrical surface and, possibly, relative to the wobble member in circumferential direction, without any interference by the wobble member. After forming the ball race, the shaping tool can be guided via a relative motion between the wobble member and the shaping tool in a substantially parallel relationship to the cylindrical surface.

Preferably, the wobble member is made by a deep-drawing process by so positioning the cylindrical surface in relation to the drawing direction of the drawing tool that an ejection of the wobble member from the deep drawing mold is easily accomplished. When the cylindrical surface extends perpendicular to the swash plate, respective deep drawing tools can be easily configured.

BRIEF DESCRIPTION OF THE DRAWING

The above and other objects, features and advantages of the present invention will now be described in more detail with reference to the accompanying drawing in which the sole

DETAILED DESCRIPTION OF A PREFERRED EMBODIMENT

Figure 1:
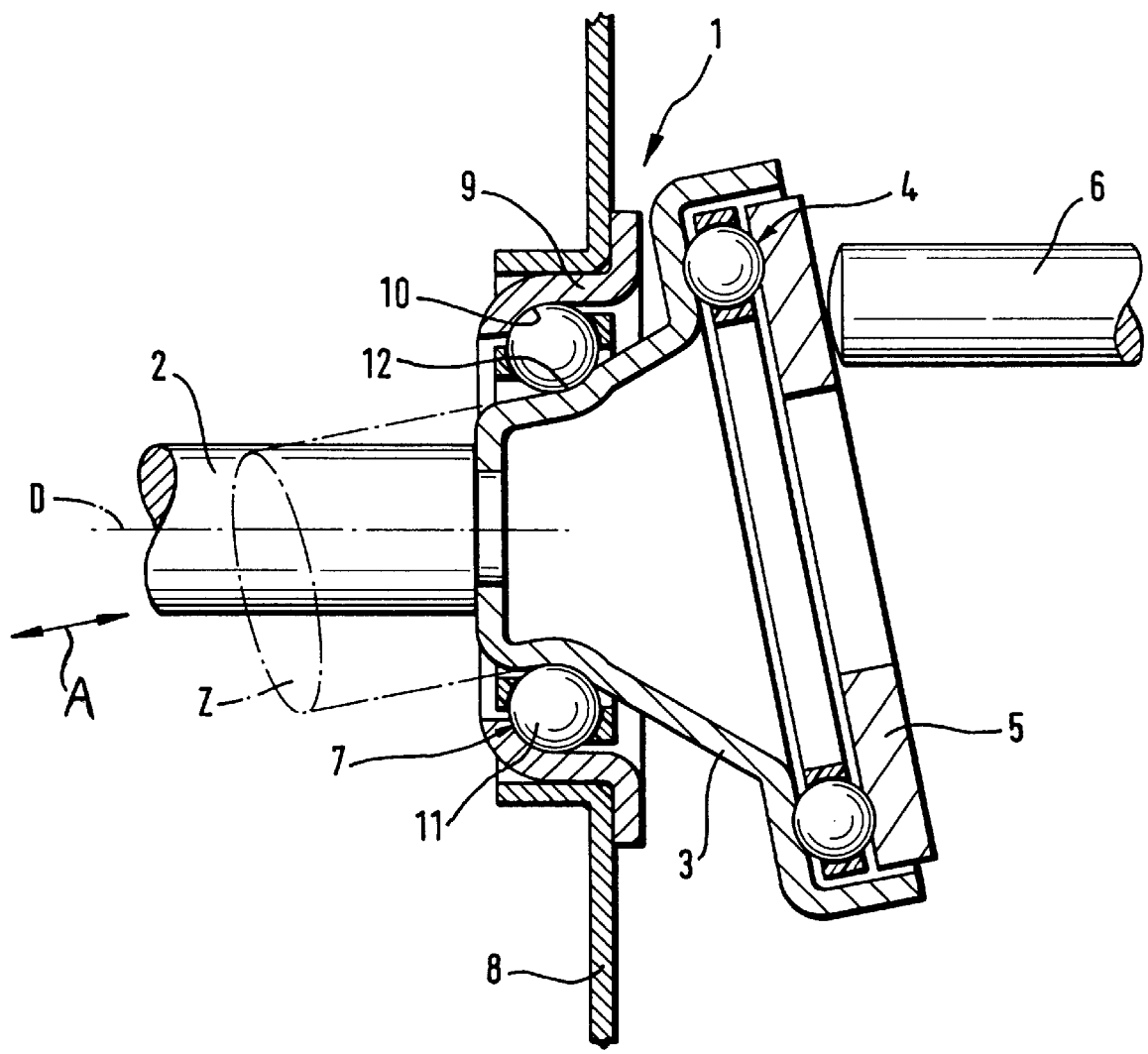
FIG. 1 shows a sectional view of an axial piston machine according to the present invention.

Turning now to the drawing, and in particular to FIG. 1, there is shown a sectional view of an axial piston machine according to the present invention, typically used for high-pressure cleaning devices. The axial piston machine includes a wobble drive, generally designated by reference numeral 1 and including a wobble member 3 which is mounted on a drive shaft 2 for rotation about an axis of rotation D of the drive shaft 2. A swash plate 5 is received by the wobble member 3 at an inclination with respect to the drive shaft 2 and rotatably supported in the wobble member 3 by an intermediate axial ball bearing 4. A piston 6 bears on the swash plate 5 at its end face distant to the axial ball bearing 4. The wobble member 3 is supported by a machine part 8 via an angular-contact ball bearing 7.

The angular-contact ball bearing 7 includes a plurality of balls 11 which are confined between an outer ball race 10 of an outer ring 9 made from sheet metal through a deep drawing process, and an inner ball race 12 which is formed on the wobble member 3 by a non-cutting process. Between its ends, the wobble member 3 is configured as a cone which is flared in the direction of the swash plate. The conical portion of the wobble member 3 lies within a cylindrical surface Z which is arranged perpendicular to the swash plate 5, whereby the base of the ball race 12 is tangent to the cylindrical surface Z.

In an axial piston pump according to the present invention, the ball race 12 can be easily formed, in particular through a deep drawing process. The wobble member 3 is drawn in a suitable deep drawing die (not shown), with the drawing tool being drawn in a direction indicated by arrow A in an essentially parallel relationship to the cylindrical surface Z.

While the invention has been illustrated and described as embodied in an axial piston machine with improved wobble drive, it is not intended to be limited to the details shown since various modifications and structural changes may be made without departing in any way from the spirit of the present invention.

What is claimed as new and desired to be protected by Letters Patent is set forth in the appended claims:

1. An axial piston machine, comprising a wobble drive having a wobble member rotatable about an axis of rotation, and a swash plate rotatably supported by the wobble member and extending at an inclination with respect to the axis of rotation, for interaction with at least one piston positioned on one end face of the swash plate, said wobble member having a conical portion which is flared in the direction of the swash plate and formed with a ball race for a ball bearing, wherein the ball race defines a base which is tangent to a cylindrical surface within which the wobble member extends radially, said cylindrical surface being arranged perpendicular to the swash plate.

2. The machine of claim 1 wherein the wobble member is made by a deep drawing process, with the cylindrical surface extending substantially parallel to a drawing direction of a drawing tool.

3. An axial piston machine, comprising:
   a wobble drive having a wobble member rotatable about an axis of rotation, and a swash plate rotatably supported by the wobble member and extending at an inclination with respect to the axis of rotation, for interaction with at least one piston positioned on one end face of the swash plate, said wobble member having a conical portion which is flared in the direction of the swash plate; and
   a ball bearing for supporting the wobble member upon a machine element, said ball bearing having an outer ring formed with an outer ball race, an inner ball race formed circumferentially on an outside surface of the wobble member, and a plurality of balls confined between the outer and inner ball races,
   wherein the ball race has a base which is tangent to an imaginary cylinder so positioned that the conical portion of the wobble member extends radially within the cylinder, said imaginary cylinder being arranged perpendicular to the swash plate.

4. An axial piston machine, comprising:
   a wobble drive having a wobble member which has an aperture for attachment to a drive shaft and is rotatable about an axis of rotation, said wobble member being made by a deep drawing process and having an inner first ball race made through a non-cutting manufacturing process, and a second ball race, with the first and second ball races positioned on opposite sides of the wobble member;
   a ball bearing for supporting the wobble member upon a machine part, said ball bearing having an outer ring made from sheet metal by a deep drawing process, wherein the inner first ball race of the wobble member is provided for the ball bearing; and
   a swash plate rotatably supported by the wobble member via an intermediate axial ball bearing, which is received by the second ball race, and extending at an inclination with respect to the axis of rotation, for interaction with at least one piston positioned on one end face of the swash plate, said wobble member having a conical portion which is flared in the direction of the swash plate.

\* \* \* \* \*